United States Patent
Göpner

(10) Patent No.: US 10,289,118 B2
(45) Date of Patent: May 14, 2019

(54) METHOD FOR AUTOMATICALLY ALIGNING AN INDUSTRIAL TRUCK IN A WAREHOUSE, AND SYSTEM COMPRISING AN INDUSTRIAL TRUCK AND A WAREHOUSE

(71) Applicant: Jungheinrich Aktiengesellschaft, Hamburg (DE)

(72) Inventor: Oliver Göpner, Oering (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 15/833,473

(22) Filed: Dec. 6, 2017

(65) Prior Publication Data
US 2018/0157263 A1    Jun. 7, 2018

(30) Foreign Application Priority Data

Dec. 6, 2016 (DE) .................... 10 2016 123 542

(51) Int. Cl.
*B66F 9/06* (2006.01)
*G05D 1/00* (2006.01)
(Continued)

(52) U.S. Cl.
CPC ........... *G05D 1/0212* (2013.01); *B66F 9/063* (2013.01); *B66F 9/0755* (2013.01);
(Continued)

(58) Field of Classification Search
CPC .. G05D 1/0212; G05D 1/0011; G05D 1/0251; G05D 2201/0216; B66F 9/063; B66F 9/07581; B66F 9/0755
See application file for complete search history.

(56) References Cited

U.S. PATENT DOCUMENTS 3,575,305 A * 4/1971 Burch ................. B65G 1/0421
                                                  414/273
3,670,905 A * 6/1972 Burch ................. B65G 1/0421
                                                  414/274
(Continued)

FOREIGN PATENT DOCUMENTS

EP    2392538 A2    12/2011
EP    2500871 A1    9/2012
(Continued)

OTHER PUBLICATIONS

EP 17205166.6; Filing Date Dec. 4, 2017; European Search Report dated Apr. 16, 2018 (3 pages).

*Primary Examiner* — Russell Frejd
(74) *Attorney, Agent, or Firm* — Barclay Damon LLP

(57) ABSTRACT

A method and system for automatically aligning an industrial truck in a warehouse, comprising the steps of determining a relative position of an operator with respect to an industrial truck by a positioning unit of the industrial truck, aligning the industrial truck in first predetermined side orientation with respect to a first object located on the left side of the industrial truck in the drive direction of the industrial truck when the relative position of the operator lies on the left side of the industrial truck, and aligning the industrial truck in a second predetermined side orientation with respect to a second object located on the right side of the industrial truck in the drive direction of the industrial truck when the relative position of the operator lies on the right side of the industrial truck.

20 Claims, 3 Drawing Sheets

(51) Int. Cl.
    *G05D 1/02*         (2006.01)
    *B66F 9/075*       (2006.01)

(52) U.S. Cl.
    CPC ........ *B66F 9/07581* (2013.01); *G05D 1/0011* (2013.01); *G05D 1/0251* (2013.01); *G05D 2201/0216* (2013.01)

(56) References Cited

U.S. PATENT DOCUMENTS

| | | | | |
|---|---|---|---|---|
| 3,746,189 | A | * | 7/1973 | Burch ................ B65G 1/0428 414/273 |
| 3,814,026 | A | * | 6/1974 | Maloney ................ B62D 37/00 104/120 |
| 3,826,349 | A | * | 7/1974 | Stevenson ................ B65G 1/06 198/719 |
| 3,984,019 | A | * | 10/1976 | Brudi ..................... B66F 9/149 414/607 |
| 4,543,031 | A | * | 9/1985 | Luebrecht ................ B66F 9/10 414/631 |
| 5,370,492 | A | * | 12/1994 | Gleyze ................ B65G 1/0492 414/279 |
| 5,938,710 | A | * | 8/1999 | Lanza .................... B66F 9/063 180/169 |
| 8,072,309 | B2 | | 12/2011 | Kraimer et al. |
| 8,193,903 | B2 | | 6/2012 | Kraimer et al. |
| 8,239,251 | B2 | | 8/2012 | Wellman |
| 8,249,910 | B2 | | 8/2012 | Wellman et al. |
| 8,452,464 | B2 | | 5/2013 | Castaneda et al. |
| 8,725,317 | B2 | | 5/2014 | Elston et al. |
| 8,725,362 | B2 | | 5/2014 | Elston et al. |
| 8,725,363 | B2 | | 5/2014 | Elston et al. |
| 8,731,777 | B2 | | 5/2014 | Castaneda et al. |
| 8,963,704 | B2 | * | 2/2015 | Adami ................ B66F 17/003 340/463 |
| 8,970,363 | B2 | | 3/2015 | Kraimer et al. |
| 9,002,581 | B2 | | 4/2015 | Castaneda et al. |
| 9,082,293 | B2 | | 7/2015 | Wellman et al. |
| 9,122,276 | B2 | | 9/2015 | Kraimer et al. |
| 9,152,933 | B2 | | 10/2015 | Wellman |
| 9,202,186 | B2 | | 12/2015 | Wellman et al. |
| 9,207,673 | B2 | | 12/2015 | Pulskamp et al. |
| 9,493,184 | B2 | | 11/2016 | Castaneda et al. |
| 9,522,817 | B2 | | 12/2016 | Castaneda et al. |
| 9,645,968 | B2 | | 5/2017 | Elston et al. |
| 9,908,527 | B2 | | 3/2018 | Elston et al. |
| 2003/0044047 | A1 | | 3/2003 | Kelly et al. |
| 2009/0198371 | A1 | * | 8/2009 | Emanuel ................ B66F 9/0755 700/226 |
| 2011/0166721 | A1 | * | 7/2011 | Castaneda .......... B62D 15/0265 701/2 |
| 2012/0078471 | A1 | * | 3/2012 | Siefring ................ B66F 9/0755 701/41 |
| 2014/0195121 | A1 | * | 7/2014 | Castaneda .......... B62D 15/0265 701/41 |
| 2015/0057843 | A1 | * | 2/2015 | Kraimer ............... B60R 21/0132 701/2 |
| 2017/0057798 | A1 | | 3/2017 | Dues et al. |
| 2018/0060764 | A1 | * | 3/2018 | Hance ................ G06Q 10/043 |
| 2018/0068255 | A1 | * | 3/2018 | Hance ................ B65G 57/03 |
| 2018/0079633 | A1 | | 3/2018 | Kraimer et al. |

FOREIGN PATENT DOCUMENTS

| | | |
|---|---|---|
| EP | 2468678 B1 | 11/2015 |
| EP | 2851331 B1 | 2/2016 |

* cited by examiner

METHOD FOR AUTOMATICALLY ALIGNING AN INDUSTRIAL TRUCK IN A WAREHOUSE, AND SYSTEM COMPRISING AN INDUSTRIAL TRUCK AND A WAREHOUSE

CROSS REFERENCE TO RELATED APPLICATIONS

This application is based upon and claims priority to, under relevant sections of 35 U.S.C. § 119, German Patent Application No. 10 2016 123 542.3, filed Dec. 6, 2016, the entire contents of which are hereby incorporated by reference.

TECHNICAL FIELD

The invention relates to a method for automatically aligning an industrial truck, in particular an order-picking vehicle, in a warehouse. Moreover, the invention relates to a system comprising an industrial truck, in particular an order picker, and a warehouse.

BACKGROUND

Industrial trucks must be aligned within a warehouse in order to correctly pick up and deliver the goods to be transported. For example, order pickers are positioned within a shelf aisle of a warehouse near a storage bin from which materials are to be removed. The order picker is positioned on one side of the shelf aisle. For the operator, this allows a very short transportation path from the storage bin to the picking vehicle. Currently, such a side orientation of an order picker within the shelf aisle is basically done manually. It is, for example, known that the operator moves the order picker to the corresponding side of the shelf using a control unit provided on the industrial truck or a remote control unit. Semi-automated procedures are also known in which the operator indicates by pressing a button whether the industrial truck is, for example, supposed to orient itself on the right or left of the shelf, and then the industrial truck independently moves to the corresponding side of the shelf. It is also possible for the industrial truck to automatically be oriented on the side of the shelf on which it was (manually) approached by the operator. The described methods therefore always require additional input by an operator to specify a side orientation.

A method is known from EP 2 851 331 B1 for controlling an industrial truck in which the industrial truck has an optical sensor with a monitoring region, wherein the optical sensor is connected to a control device that determines the position of a person within a monitoring region specified for the optical sensor, and makes the industrial truck follow the person. For this, monitoring limits are specified within the monitoring region, and their breach by a person is monitored by a control device. If a breach of a monitoring limit is discerned, a drive of the industrial truck is controlled to move the vehicle forward until the person is again located on the original side of the monitoring limit. The vehicle thereby follows the person.

A method for integrating an autonomous industrial truck in a plant administration system is known from EP 2 500 871 A1. The industrial truck has a navigation system and a plurality of other sensors whose data are transmitted wirelessly to the plant administration system. By means of the plant administration system, an operator can interact with the industrial truck and accordingly control it remotely. If the industrial truck becomes inoperable, for example due to an obstacle in its driving path, the event is reported to the plant administration system, and then an operator can intervene in the driving behavior of the industrial truck.

A horizontal order picker is known from EP 2 392 538 A2 that comprises an operating element that, upon being actuated, independently moves the horizontal picker a length corresponding to a distance between an operating state of the horizontal order picker and a bin. This can save the path of the operator between the pickup point and bin.

BRIEF SUMMARY OF THE INVENTION

A method is provided for automatically aligning an industrial truck in a warehouse comprising the steps of: determining a relative position of an operator with respect to an industrial truck by a positioning unit of the industrial truck; aligning the industrial truck, by a control unit operably coupled to the industrial truck, in a predetermined side orientation with respect to an object located on the left side of the industrial truck in the drive direction of the industrial truck when the relative position of the operator lies on the left side of the industrial truck; and aligning the industrial truck, by the control unit, in a predetermined side orientation with respect to an object located on the right side of the industrial truck in the drive direction of the industrial truck when the relative position of the operator lies on the right side of the industrial truck.

A system is also provided including: a positioning unit of configured to determine a relative position of an operator with respect to an industrial truck; and a control unit configured to: (i) align the industrial truck in a predetermined side orientation with respect to an object on the left side of the industrial truck in the drive direction when the determined relative position of the operator lies on the left side of the industrial truck, and (ii) align the industrial truck in a predetermined side orientation with respect to an object located on the right side of the industrial truck in the drive direction when the determined relative position of the operator lies on the right side of the industrial truck.

According to the invention, the relative position of the operator with respect to the industrial truck is initially determined. The positioning unit of the industrial truck used for this can, for example, comprise at least three transmission and receiving units that cover a fixed vehicle coordinate system. The at least three transmitting and receiving units can be designed to transmit signals that are answered by the operator, in particular by a remote control unit worn by, or operably coupled to, the operator. The signal propagation of these signals allows the distance between the operator and each of the at least three transmitting and receiving units to be determined. Triangulation or trilateration may be used to determine the position of the operator in the fixed vehicle coordinate system and the relative position of the operator with respect to the industrial truck.

Depending on the determined relative position of the operator with respect to the industrial truck, the industrial truck may be automatically aligned. More specifically, the industrial truck is aligned relative to an object that is located on the same vehicle side as the operator. If the positioning unit should determine the relative position of the operator as lying on the left side of the industrial truck, the industrial truck is aligned relative to an object located on the left side. If the positioning unit should determine the relative position of the operator as located on the right side of the industrial truck, the industrial truck is aligned relative to an object located on the right side. The alignment is carried out by means of a control unit of the industrial truck. In particular, the control unit can transmit control commands to a drive and/or a steering system of the industrial truck corresponding to the desired alignment of the industrial truck. In the context of this application, the side specifications, "left" and "right", always refer to the drive device of the industrial truck if not otherwise indicated.

The method or system, according to the present embodiment makes it possible to align the industrial truck relative to an object depending on a determined position of the operator. In so doing, the industrial truck aligns automatically relative to an object that is located on the side of the operator. This object can, for example, be a wall or a shelf. Given this automated alignment according to the invention, manual entry by an operator to specify a side orientation is no longer necessary.

According to a preferred embodiment, the objects are side of the shelfs of a shelf aisle of the warehouse. The industrial truck can be aligned relative to a left or right side of the shelf. In this context, the warehouse can comprise several shelves with shelf aisles lying in between, wherein each shelf aisle has two side of the shelfs. With respect to a drive direction of an industrial truck traveling along the shelf aisle, the shelf aisle accordingly has a left and right side of the shelf. If a person is, for example, close to a left side of the shelf viewed in the drive direction of the industrial truck, the industrial truck can approach this left side of the shelf and orient itself on the side of this side of the shelf. The person can then transport goods from the corresponding shelf to the industrial truck in a particularly easy manner, i.e., carry out a picking procedure. If the person switches to the other side of the industrial truck, the industrial truck can correspondingly align relative to a right side of the shelf in the drive direction of the industrial truck. The industrial truck can move straight and laterally by correspondingly controlling its drive, or respectively its steering system, to achieve a desired side orientation relative to a side of the shelf. The orienting of the industrial truck is carried out such that the operator or picker can convey goods from the shelf to the industrial truck very easily and efficiently, in particular onto the load portion of the industrial truck.

According to another embodiment, the industrial truck is aligned in the predetermined side orientation with respect to the left side of the shelf in that the industrial truck is positioned at a specific distance relative to the left side of the shelf, and/or the industrial truck is aligned in the predetermined side orientation with respect to the right side of the shelf in that the industrial truck is positioned at a specific distance to the right side of the shelf. The control unit is designed to correspondingly position the industrial truck. Depending on the ascertained position of the operator, the industrial truck can hence be positioned at a predetermined distance from the corresponding side of the shelf. The industrial truck can be oriented at an angle relative to the respective side of the shelf in its drive direction. Likewise, the industrial truck can also be aligned parallel to the side of the shelf in the drive direction. The predetermined distance is preferably selected so that the person located between the industrial truck and shelf can transport goods very easily and efficiently from the shelf to the industrial truck. For example, the industrial truck can be positioned so that the person does not have to take any additional steps and must only rotate to pick goods from the shelf to the industrial truck. This is a particularly efficient way to pick and place goods on the industrial truck.

According to another embodiment, the industrial truck may be aligned with an object located on the left side of the industrial truck in the drive direction when the distance between the relative position of the operator to a fixed vehicle reference axis exceeds a first predetermined threshold distance, and may be aligned with an object located on the right side of the industrial truck in the drive direction when the distance between the relative position of the operator to the fixed vehicle reference axis exceeds a second predetermined threshold distance. The control unit of the industrial truck is correspondingly designed to position the industrial truck at a specific distance to the left, or respectively right side of the shelf. The first distance value can define a distance from the industrial truck to the left, whereas the second distance value can define a distance from the industrial truck to the right. The fixed vehicle reference axis can, for example, be a middle longitudinal axis of the industrial truck. The distance values can be saved in the control of the industrial truck. The control unit of the industrial truck can continuously or intermittently compare the distance value ascertained from the relative position of the operator with the saved distance values. If the operator distances himself enough from the industrial truck to exceed the first distance value, the industrial truck is aligned with an object located on the left side. If the operator distances himself from the industrial truck such that the first distance value is exceeded, the industrial truck is aligned with an object located on the right side. The industrial truck accordingly only automatically aligns with an object when the corresponding distance value is exceeded. The first distance value can define a first area extending beyond the left vehicle side, whereas the second distance value can define a second area extending beyond the right vehicle side. The distance values can be defined as positive or negative values on a distance axis perpendicular to the fixed vehicle reference axis. Defining such distance values can cause the industrial truck to only align when the operator is located at a certain minimum distance from the industrial truck. For example, this can accordingly prevent an automatic alignment when the operator is located on the industrial truck or very close to the industrial truck, for example to receive or stack goods.

A third distance value can also be defined that is larger than the first distance value and defines a third area extending beyond the left vehicle side, and a fourth distance value can also be defined that is larger than the second distance value and defines a fourth area extending beyond the right vehicle side. In this context, it may be provided that there is no alignment of the industrial truck when the relative position of the operator is located at a distance from the fixed vehicle reference axis which is greater than the second, or respectively, the fourth distance value. A third, or respectively fourth area can accordingly be defined on both sides of the fixed vehicle reference axis which is limited by two distance values, wherein an alignment of the industrial truck only occurs when the relative position of an operator lies within one of these areas. In particular, the left side of the industrial truck in the drive direction can be defined by the third area, and the right side of the industrial truck in the drive direction can be defined by the fourth area. If a person is located close enough to the industrial truck or far enough from the industrial truck that his determined relative position lies outside of the third, or respectively fourth area, there is no automatic alignment of the industrial truck. This can accordingly prevent, for example, the industrial truck from changing its position both when the operator is at a great distance, or due to the presence of third parties.

According to another embodiment, the industrial truck moves in the drive direction without a side orientation when the distance of the relative position of the operator to the fixed vehicle reference axis lies between the first threshold distance and the second threshold distance. Accordingly, an additional area is defined, within which the presence of an operator results in a forward movement without side orientation of the industrial truck. This area can, for example, lie in particular within the industrial truck, for example within the region of a standing platform of the industrial truck. Accordingly, automated forward movement of the industrial truck can occur when an operator is located for example on the industrial truck. Likewise, this additional area can be defined close to an outer contour of the industrial truck, for example within a range of 0 mm to 500 mm distant from the outer contour. Accordingly, an automated forward movement of the industrial truck can occur when an operator is located close to the outer contour of the industrial truck. The industrial truck can accordingly move next to the operator.

According to another embodiment, the relative position of the operator with respect to the industrial truck is determined by at least one laser scanner, at least one 3-D camera, or respectively by radiolocation. To determine the relative position of the operator by means of radiolocation, in particular at least three transmitting and receiving units can be provided as already mentioned.

If at least three transmitting and receiving units are provided, the relative position of the operator with respect to the industrial truck according to another embodiment can be determined by the following steps. At least three transmitting and receiving units of the industrial truck transmit search signals, the search signals are received and processed by a remote control unit, response signals corresponding to the search signals are transmitted by the remote control unit, signal propagation times of the transmitted search signals and the received corresponding response signals are ascertained by an evaluation unit of the industrial truck, and the relative position of an operator wearing the remote control unit is determined by determining the relative position of the remote control unit with respect to the industrial truck. The corresponding system can also comprise a remote control unit. In this context, as part of the positioning unit, at least three transmitting and receiving units are arranged at a predetermined spatial arrangement relative to each other on the industrial truck. Moreover, an evaluation unit can be provided as part of the positioning unit, or respectively the control unit for ascertaining the signal propagation times and for determining the position of the remote control unit.

According to this embodiment, the relative position of the operator with respect to the industrial truck is therefore not determined directly; instead, the relative position of a remote control unit is determined with respect to the industrial truck. The operator can wear the remote control unit. Each of the at least three transmitting and receiving units of the industrial truck can transmit a search signal that is received and processed by the remote control unit. Each of the search signals can have an ID identifying the respective transmitting and receiving unit. The remote control unit processes the respective search signals by generating corresponding response signals. The respective responsive signal can also contain the respective ID that identifies the remote control unit. Moreover, the respective response signal can contain an ID that enables a clear assignment to the transmitting and receiving unit that sent the corresponding search signal. The remote control unit can, for example, be designed as a portable handheld device or a glove. The returned response signals are received by the respective transmitting and receiving unit, and the respective signal propagation times are determined by the evaluation unit. In this context, an internal processing unit of the remote control unit for processing the search signals can be taken into consideration. Accordingly, at least three signal propagation times are determined. From these determined signal propagation times, the evaluation unit determines the distance of each of the at least three transmitting and receiving units to the remote control unit by using computational methods such as trilateration. This gives the position of the remote control unit with reference to the industrial truck. This method of determining position is very precise and reliable.

BRIEF DESCRIPTION OF THE DRAWINGS

The invention will be explained below with reference to figures. If not otherwise specified, the same reference numbers indicate the same objects. In the following.

DETAILED DESCRIPTION OF THE INVENTION

Figure 1:
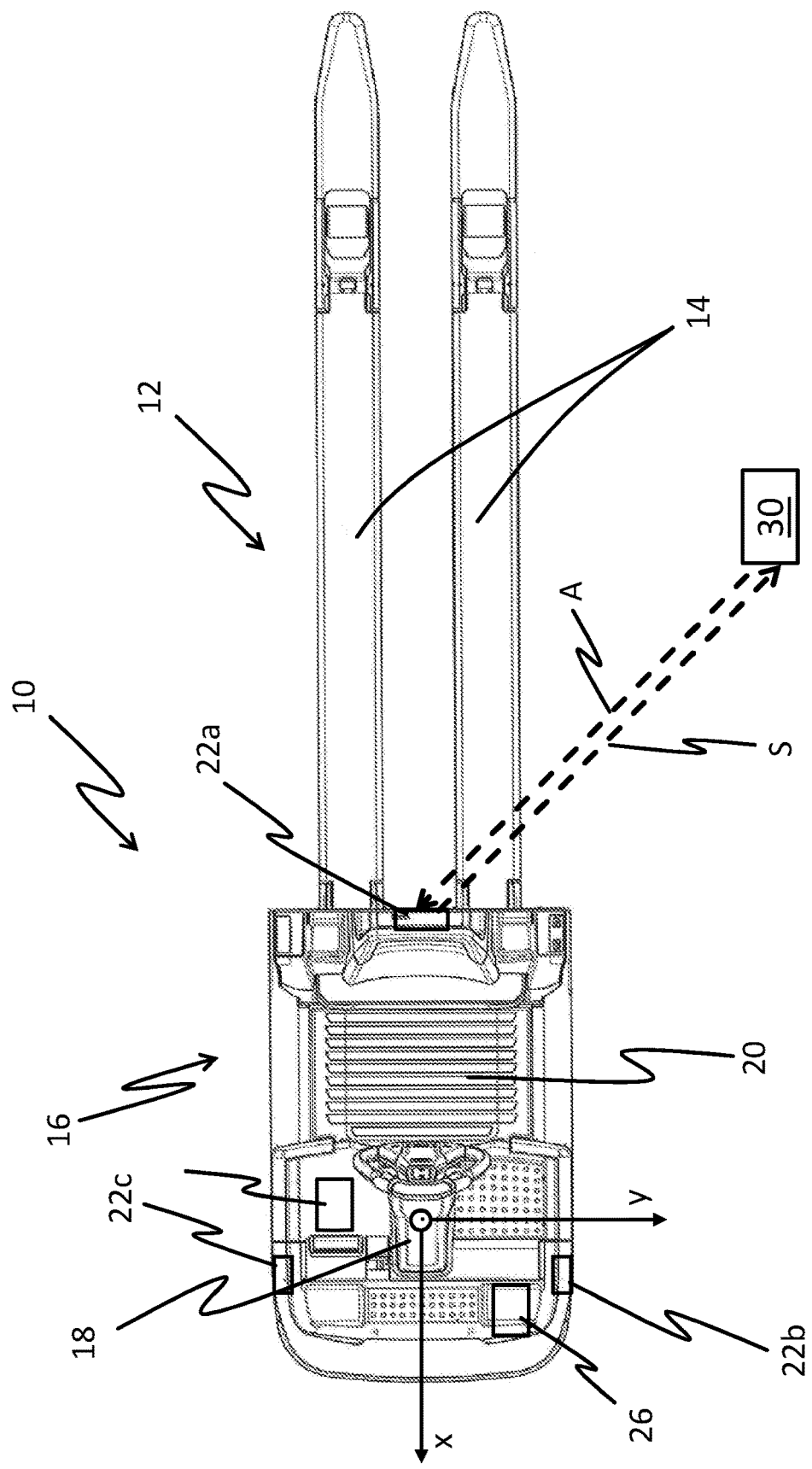
FIG. 1 shows an industrial truck in a plan view.

FIG. 1 depicts a top view of an industrial truck 10 comprising a load part 12 with a two forks 14 for receiving pallets for picking goods. Moreover, the industrial truck 10 comprises a drive part 16 with a short drawbar 18 and a standing platform 20. An operator standing on the standing platform 20 can guide the industrial truck 10 by the short drawbar 18. Three transmitting and receiving units 22a, 22b, 22c are arranged on the drive part 16, and their positions are defined in a fixed vehicle coordinate system. The fixed vehicle coordinate system is covered by three axes X, Y and Z that are at right angles to each other, wherein the Z axis in FIG. 1 extends into the plane of the page. The positions of the three transmitting and receiving units 22a, 22b, 22c can be saved in the control unit 24 of the industrial truck 10. Moreover, a schematically represented remote control unit 30 is discernible in FIG. 1. Furthermore, the industrial truck has a drive/steering system 26 that can be controlled by the control unit 24.

The three transmitting and receiving units 22a, 22b, 22c transmit search signals which are received and processed by the remote control unit 30. The remote control unit 30 then transmits corresponding response signals which are also received by the respective transmitting and receiving units. For reasons of clarity, FIG. 1 depicts only one search signal S transmitted by the transmitting and receiving unit 22a to the remote control unit 30 and one response signal A returned to the transmitting and receiving unit 22a by the remote control unit 30. From the transmission and return propagation times of the respective search and response signals, the control unit 24 of the industrial truck 10 can, as an evaluation unit, ascertain the distance of the remote control unit to each of the transmitting and receiving units and accordingly determine the position of the remote control unit 30 in the fixed vehicle coordinate system. The evaluation unit can in principle also be part of the positioning unit. Moreover, a fixed vehicle reference axis 40 is saved in the control unit 24 and extends along the x-axis, as can be seen in FIG. 2.

Figure 2:
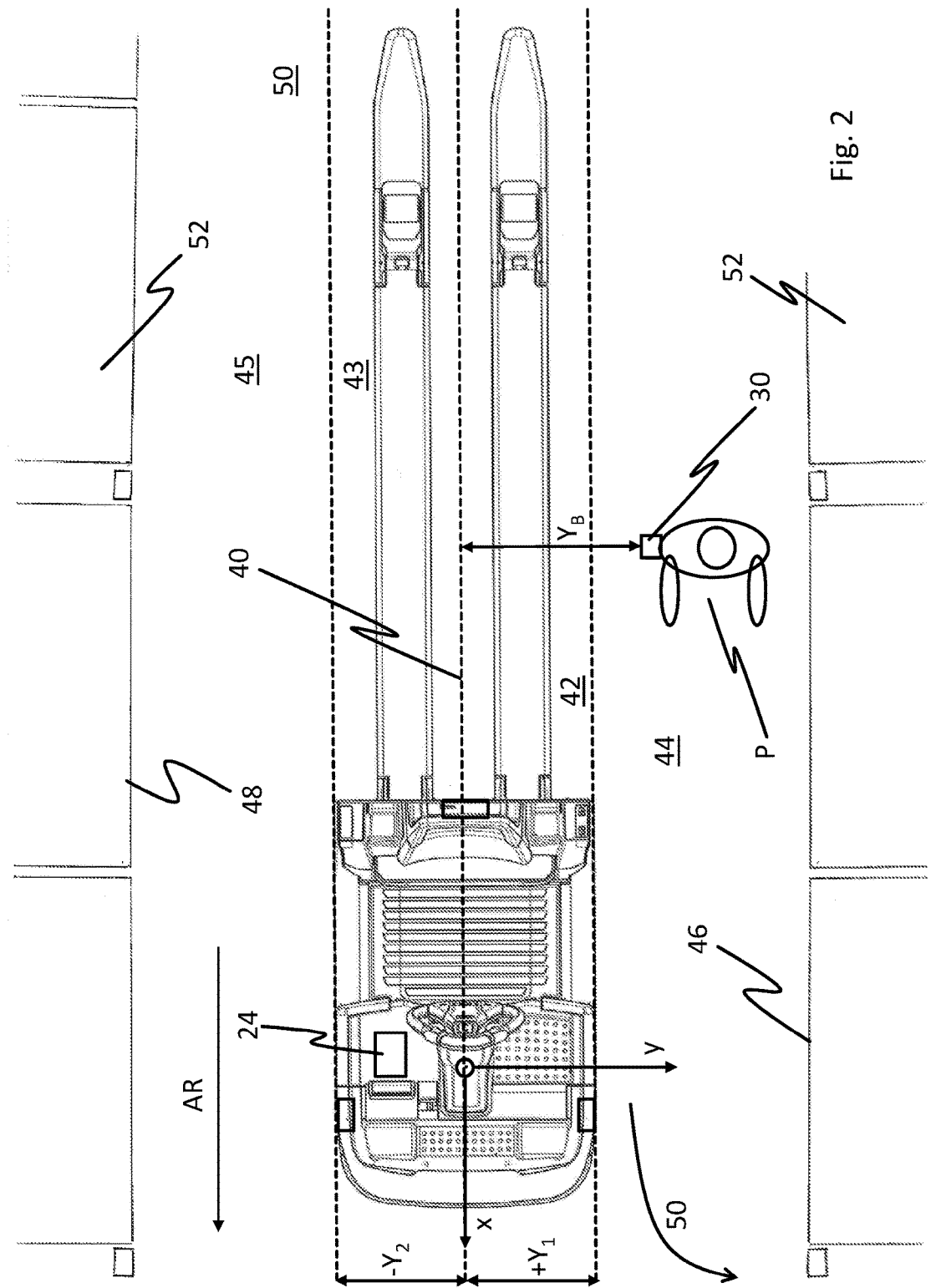
FIG. 2 shows the industrial truck from FIG. 1 in a warehouse together with an operator.

FIG. 2 shows the industrial truck from FIG. 1 in a shelf aisle 50 that extends between two shelves 52. A drive direction AR of the industrial truck extends along the x-axis. The following side designations refer to this direction. Two distance values Y1 and Y2 are defined that extend from the fixed vehicle reference axis 40. The first distance value Y1 is defined as a positive value on the y-axis, whereas the second distance value Y2 is defined as a negative value on the y-axis. Accordingly, a first area 42 is covered between the fixed vehicle reference axis 40 and the first distance value Y1, whereas a second area 43 is covered by the fixed vehicle reference axis 40 and the second distance value Y2. A third area 44 extends up to a third distance value (not shown) outside of the first area 42, i.e., with distance values greater than the first distance value Y1. A fourth area 45 extends up to a fourth distance value (not shown) outside of the second area 43, i.e., with distance values with an amount greater than the second distance value Y2. Like the first distance value, the third distance value is defined as a positive value along the y-axis, whereas like the second distance value, the first distance value is defined in the negative direction along the y-axis. The third and fourth distance value can, for example, extend into the respective shelf. Within the third area 44, there is an operator P who wears a remote control unit 30. This remote control unit 30 is accordingly at a distance YB with respect to the fixed vehicle reference axis 40 that is greater than the positively defined first distance value Y1. Since the relative position of the operator is accordingly located on the left side of the industrial truck, the industrial truck aligns with respect to the left side of the shelf 46. In this context, the industrial truck 10 aligns with respect to the left side of the shelf 46 by assuming a predetermined side orientation relative to this side of the shelf, i.e., positioning itself at a specific distance from the side of the shelf 46 as parallel as possible. A control command is made by the control unit 24 to a drive/steering system 26 of the industrial truck 10 so that the industrial truck 10 moves approximately along the line 50 forward and to the left side.

The aligned industrial truck is accordingly in an optimum picking position that enables the operator to very easily and efficiently remove goods from the left side shelf and position them on the forks 12 of the industrial truck 10. Of course, the operator together with the remote control unit 30 can also be located in the area 45, wherein the distance of the operator P, or respectively the remote control unit 30, from the fixed vehicle reference axis 40 is less than the negatively defined second distance value Y2. The amount of the distance between the relative position of the operator and the fixed vehicle reference axis of course exceeds the second distance value Y2. Correspondingly, an alignment of the industrial truck with the right side of the shelf 48 would then occur.

If the operator together with the remote control unit 30 is located within area 42 or within area 43, the industrial truck accordingly moves in the drive direction AR without executing a side orientation. The distance value YB of the remote control unit then lies between the positively defined first distance value Y1 and the negatively defined second distance value Y2. It can accordingly for example be achieved that the industrial truck 10 moves in the drive direction AR when the operator together with the remote control unit 30 climbs onto the standing platform 20. Of course, the first and second distance value Y1, Y2 can also have the same (positive or negative) value. A side selection would then accordingly always be active. If the areas 42, 43 are defined so that they extend beyond an outer contour of the industrial truck, for example up to 500 mm, the industrial truck can automatically travel alongside an operator.

Figure 3:
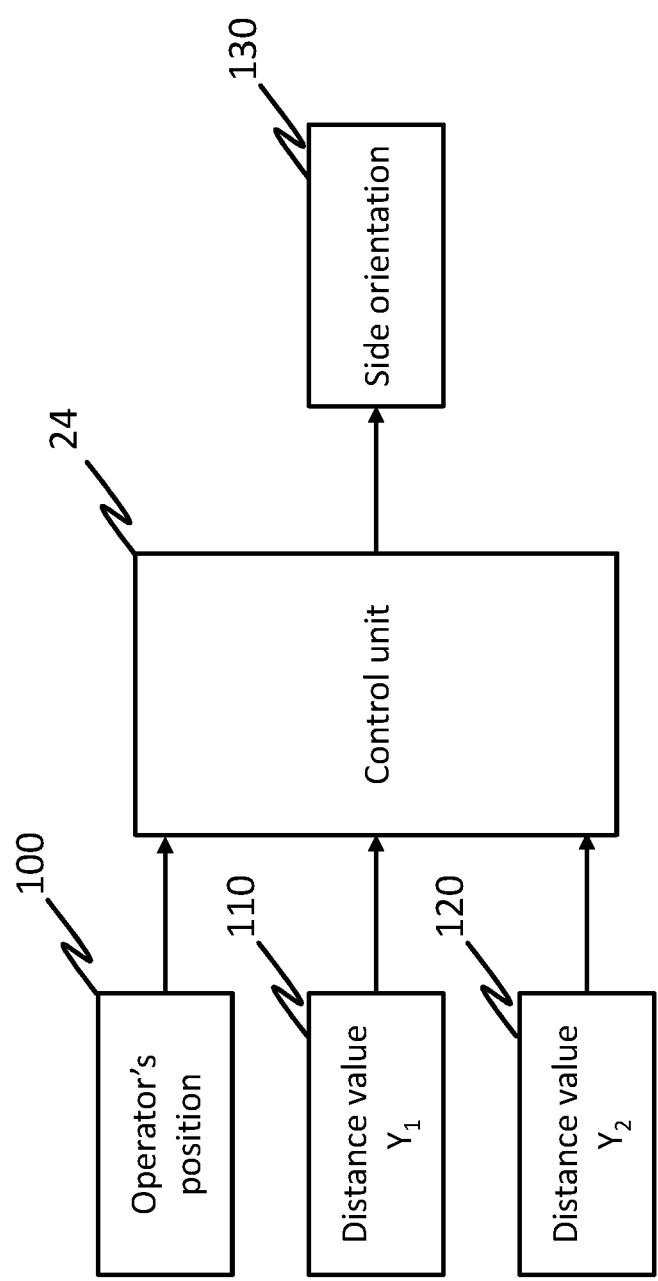
FIG. 3 shows a flow chart of an embodiment of the method according to the invention.

FIG. 3 schematically portrays the information entered into the control unit before it triggers a side orientation. As explained, the control unit takes into account the position of the operator ("Operator position", step 100) and distance value Y1 ("Distance value Y1", step 110) and distance value Y2 ("Distance value Y2", step 120). On the basis of this information, the control unit aligns the industrial truck in the above-described manner ("Side orientation", step 130).

The invention claimed is:

1. A method for aligning an industrial truck, comprising the steps of:
    determining a relative position of an operator with respect to the industrial truck by a positioning unit;
    configuring a control unit to automatically align the industrial truck in a first predetermined side orientation with respect to a first object located on a left side of the industrial truck, the left side being defined as a drive direction of the industrial truck when the relative position of the operator is on the left side of the industrial truck; and
    configuring the control unit to automatically align the industrial truck in a second predetermined side orientation with respect to a second object located on a right side of the industrial truck, the right side being defined as the drive direction of the industrial truck when the relative position of the operator is on the right side of the industrial truck.

2. The method according to claim 1, wherein the first and second objects are sides of a shelf in a warehouse.

3. The method according to claim 2, wherein the industrial truck is aligned with the first predetermined side orientation with respect to the left side of the shelf and wherein the industrial truck is positioned at a first distance relative to the left side of the shelf.

4. The method according to claim 2, wherein the industrial truck is aligned with the second predetermined side orientation with respect to the right side of the shelf and wherein the industrial truck is positioned at a second distance to the right side of the shelf.

5. The method according to claim 1, further comprising the step of: configuring the control unit to automatically align the industrial truck with the first object located on the left side of the industrial truck when a distance between the relative position of the operator to a fixed vehicle reference axis exceeds a first predetermined threshold distance, and aligning the industrial truck with the second object located on the right side of the industrial truck when the distance between the relative position of the operator to the fixed vehicle reference axis exceeds a second predetermined threshold distance.

6. The method according to claim 5, wherein the industrial truck moves in the drive direction without assuming the first or the second predetermined side orientations when the distance of the relative position of the operator to the fixed vehicle reference axis lies between the first predetermined threshold distance and the second predetermined threshold distance.

7. The method according to claim 1, wherein the relative position of the operator with respect to the industrial truck is determined by at least one laser scanner, and at least one 3-dimensional camera.

8. The method according to claim 1, wherein the relative position of the operator with respect to the industrial truck is determined by radiolocation.

9. The method according to one of claim 1, further comprising the steps of:
    transmitting and receiving search signals by at least three transmitting and receiving units of the industrial truck;
    processing the search signals by a remote control unit;
    transmitting response signals corresponding to the search signals; and determining a signal propagation time of each of the transmitted search signals and the transmitted response signals by an evaluation unit of the industrial truck;

wherein the relative position of an operator having the remote control unit is determined by the relative position of the remote control unit with respect to the industrial truck.

10. A system for aligning an industrial truck in a warehouse, comprising:
a positioning unit of the industrial truck configured to determine a relative position of an operator with respect to the industrial truck,
a control unit configured to align the industrial truck in first predetermined side orientation with respect to a first object on a left side of the industrial truck in a drive direction when the relative position of the operator lies on the left side of the industrial truck, and configured align the industrial truck in a second predetermined side orientation with respect to a second object located on a right side of the industrial truck in the drive direction when the relative position of the operator lies on the right side of the industrial.

11. he system according to claim 10, wherein the first and second objects are sides of a shelf in a warehouse.

12. The system according to claim 10, wherein the control unit is configured to align the industrial truck in the first predetermined side orientation with respect to the left side of a shelf in that the control unit positions the industrial truck at a first distance relative to the left side of the shelf, and wherein the control unit is configured to align the industrial truck in the second predetermined side orientation with respect to the right side of a shelf in that the control unit positions the industrial truck at a second distance relative to the right side of the shelf.

13. The system according to claim 10, wherein the control unit is configured to align the industrial truck with the first object located on the left side of the industrial truck in the drive direction when a distance between the determined relative position of the operator to a fixed vehicle reference axis exceeds a first predetermined threshold distance, and configured to align the industrial truck with the second object located on the right side of the industrial truck in the drive direction when the distance between the relative position of the operator to the fixed vehicle reference axis exceeds a second predetermined threshold distance.

14. The system according to claim 13, wherein the control unit is configured to move the industrial truck in the drive direction without assuming a first or second predetermined side orientation when the distance of the relative position of the operator to the fixed vehicle reference axis lies between the first predetermined threshold distance and the second predetermined threshold distance.

15. The system according to claim 10, wherein the positioning unit comprises at least one laser scanner, at least one 3-D camera, and at least one remote positioning unit.

16. The system according claim 10, further comprising a remote control unit, including at least three transmitting and receiving units arranged in a predetermined spatial arrangement relative to each other in the industrial truck and are configured to transmit search signals and receive response signals, the remote control unit configured to receive and process the search signals transmitted by the transmitting and receiving units and to transmit corresponding response signals.

17. The system according to claim 16, wherein the control unit is configured to align the industrial truck in the first predetermined side orientation with respect to the left side of a shelf in that the control unit positions the industrial truck at a first distance relative to the left side of the shelf, and wherein the control unit is configured to align the industrial truck in the second predetermined side orientation with respect to the right side of a shelf in that the control unit positions the industrial truck at a second distance relative to the right side of the shelf.

18. The system according to claim 16, wherein the control unit is configured to align the industrial truck with the first object located on the left side of the industrial truck in the drive direction when a distance between the determined relative position of the operator to a fixed vehicle reference axis exceeds a first predetermined threshold distance, and configured to align the industrial truck with the second object located on the right side of the industrial truck in the drive direction when the distance between the relative position of the operator to the fixed vehicle reference axis exceeds a second predetermined threshold distance.

19. The system according claim 10, wherein the positioning unit includes, an evaluation unit configured to determine signal propagation times of transmitted search signals and received response signals, configured to determine a position of a remote control unit, and configured to determine the position of an operator relative to the industrial truck from at least three of the signal propagation times between the evaluation unit and the remote control unit.

20. A system for aligning an industrial truck in a warehouse, comprising:
a positioning unit of the industrial truck configured to determine a relative position of an operator with respect to the industrial truck,
a control unit configured to: (i) align the industrial truck in first predetermined side orientation with respect to a first object on a left side of the industrial truck in a drive direction when the relative position of the operator lies on the left side of the industrial truck, (ii) align the industrial truck in a second predetermined side orientation with respect to a second object located on a right side of the industrial truck in the drive direction when the relative position of the operator lies on the right side of the industrial truck; and (iii) align the industrial truck, in response to the relative position of the operator, such that the operator is interposed between the lifting forks and one of the first and second objects.

\* \* \* \* \*